United States Patent Office 2,892,468
Patented June 30, 1959

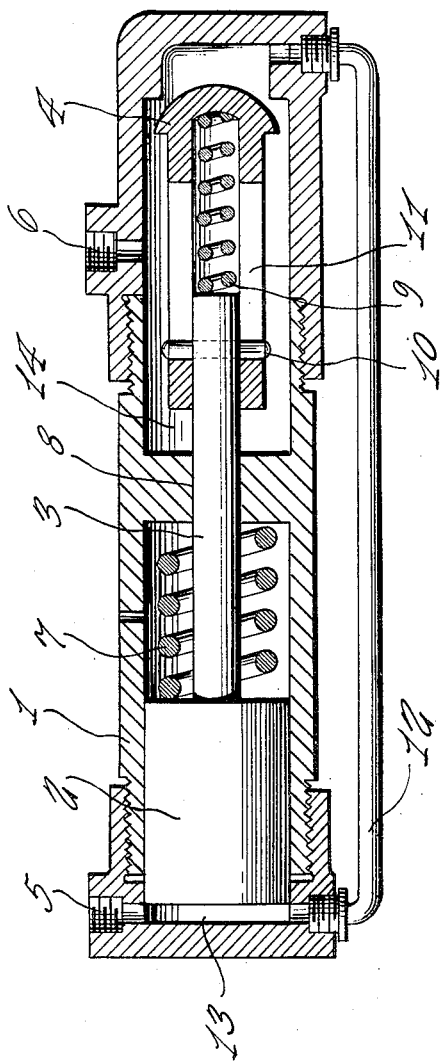
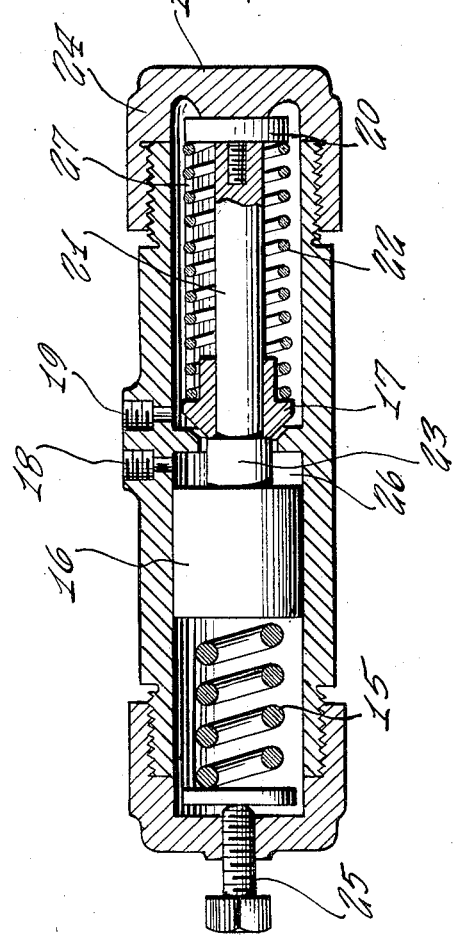

2,892,468

BRAKE CONTROL VALVE MECHANISM

Friedrich Beuchle, Frankfurt am Main, Germany, assignor to Alfred Teves Maschinen- und Armaturenfabrik KG, Frankfurt am Main, Germany Application April 13, 1955, Serial No. 501,065

Claims priority, application Germany May 29, 1954

3 Claims. (Cl. 137—505.13)

This invention relates to a hydraulic brake, more particularly for motorized vehicles. It is a known fact that due to dynamic displacement of load on the axles during the braking operation, the front wheels are subjected to higher stress than the rear wheels. As a consequence, the ratio of forces between front and rear wheels has to be variable in order to be able to utilize fully the locking force of the wheels and to avoid a premature blocking of the rear wheels.

The invention relates to hydraulic brake in which the pressure in the brake line controls the braking action on the rear wheels by means of a spring actuated piston or by means of a membrane, either of which operates a regulating valve.

The device according to the invention will now be more fully described with reference to the accompanying drawing showing two embodiments of the device. However, it should be understood that these examples are only given by way of illustration and not of limitation and that many changes in the details can be made without departing from the spirit of the invention.

In the drawing, Fig. 1 illustrates one embodiment of the regulating valve in longitudinal section, and Fig. 2 shows another embodiment of a similar regulating valve, likewise in longitudinal section.

Referring now to Fig. 1, the novel device is shown to consist essentially of a cylinder casing 1, housing a piston 2 connected by a rod 3 to a valve 4. A bore 5 in the cylinder wall is connected to a brake line (not shown) issuing from a master cylinder, and another bore 6 in the wall leads to a line (not shown) connected to the rear wheel brake cylinder associated with the rear wheels of the vehicle.

Piston 2 is in abutment by means of a spring 7, with a partition wall 8 in the cylinder dividing the cylinder into two chambers 13 and 14. Another spring 9 is arranged between the valve 4 and the piston rod 3. The valve 4 is mounted on rod 3 by means of a bolt 10 and is slidable on rod 3. The bolt 10 extends through slots 11. A line 12 connects chambers 13 and 14.

The operation is as follows: Pressure generated in a master cylinder (not shown) is transmitted by way of a pressure line to chamber 13, where it acts on the piston 2. The pressure is also transmitted by way of line 12 to chamber 14 through the opening formed by the casing 1 and the valve 4, which is variable; a pipe connected to port 6 serves to transmit pressure from chamber 14 to the brake cylinders of the rear wheels.

By means of the springs, a certain pressure is determined up to which the pressure prevailing in the brake lines will be transmitted without change to the line leading to the rear wheel brake cylinders. When the pressure in the brake line rises to an extent which exceeds the counter pressure exerted by the springs on the piston, due to pretensioning of the springs, piston 2 is moved and therewith valve 4 is operated. Due to the shift of valve 4, pressure transmitted from chamber 13 to chamber 14 is throttled, dependent on the pressure acting on piston 2. The insertion of spring 9 guarantees a continuous operation of the regulating valve. Pressure decrease in chamber 14 is dependent on the springs 7 and 9, and on the pressure increase in the main cylinder. By appropriate adjustment of the initial tension of the springs and proper dimensioning of the working surfaces of the piston and the valve, any desired transmission ratio can be attained.

Another embodiment is shown in Fig. 2. In this figure, a piston is designated by 16, which is controlled by a spring 15 and operated by the pressure built up in a master cylinder. A valve 17 is actuated thereby, which controls pressure transmission. A bore 18 is connected with the brake line coming from the master cylinder (not shown) and a bore 19 with the line leading to the rear wheel brake cylinder (not shown). Between valve 17 and a plate shaped end 20 of piston rod 21, a spring 22 is arranged. Piston rod 21 has a shoulder 23 formed thereon which forms an abutment for the slidable valve 17 on piston rod 21. Rod 21 abuts on the casing 1 with the plate-shaped end 20 by means of stop 24. A screw 25 is provided for pretensioning spring 15 to any desired degree, whereby it is possible to change the characteristic operating range of the device without dis-assembly of the spring.

This embodiment of the device operates similarly to the one shown in Fig. 1. The pressure exerted from the master cylinder is transmitted by way of the brake line to chamber 26 and there causes the piston 16 to move in dependence on the degree of pressure, thereby accomplishing a throttling of pressure transmission to chamber 27. The pressure acting on the piston directly operates the valve in this embodiment. As compared to the embodiment shown in Fig. 1, line 12 may be dispensed with.

The pressure fluid enters through inlet 18 behind the piston 16 and has free entry, up to a given pressure, to the rear wheel brake cylinders through valve 17 and outlet 19.

Thus, valve 17 also moves in the same direction as the piston and throttles the passage of the pressure agent toward space 27 and to the rear wheel brake line.

The higher the liquid pressure in chamber 26, the further piston 16 moves to the left and since it pulls with its piston rod end the valve 17 which is actuated by spring 22, a further throttling action is maintained on the passage of the pressure agent to the chamber 27 and to the rear wheel brake pipe 19.

The amount of throttling and, therefore, the proportion of the pressures in the front wheel and rear wheel pipes is determined by the dimensions of the two springs 15 and 22, the tension of which can be regulated by means of the screw 25.

Upon release of the brake, the piston moves backward until its end, shaped as a spring plate 20, seats on the stop 24 in the cylinder space 27. Valve 17 hits shoulder 23 of piston 16, and the connection between chambers 26 and 27 remains open.

Under the influence of pressure in chamber 26 the piston 16 moves towards the spring 15, accompanied by piston rod 21, valve 17, spring 22 and spring collar 20. A relative movement of valve 17 on the piston rod 21 is caused by the liquid entering from chamber 26 into chamber 27. The spring 15 can be adjusted by bolt 25 to close the valve 17 at a predetermined pressure in chamber 26. Spring 15 may be pretensioned by means of bolt 25 so that it will offer a predetermined counterforce to the liquid pressure in chamber 26, which pressure is exerted upon piston 16.

What I claim is:

1. In a hydraulic brake for motorized vehicles having front and rear wheels and a control mechanism for the braking action of the rear wheels, said control mechanism comprising a cylinder casing having two chambers therein, a piston slidably arranged in one of said chambers, a first spring in said chamber urging said piston in one direction, said spring having a predetermined initial tension, a port in said chamber for admission of a pressure fluid for actuating said piston against the spring action; a valve having a valve face controlling a passage providing communication between said chambers, said valve being arranged in the other of said chambers and being controlled by said piston, said other chamber having a discharge port for pressure fluid, a rod in said other chamber connecting said piston and said valve, said valve being slidable on said rod, and a second spring interposed between said valve and said piston rod for urging said valve in a direction opposite to the said one direction, whereby said valve regulates the discharged pressure fluid by a throttling of the amount of said discharge fluid.

2. The brake control mechanism according to claim 1, wherein said piston rod has a shoulder at each end serving as an abutment for said valve and said second spring.

3. The brake control mechanism according to claim 2, wherein said piston rod and said shoulder for said valve are integral parts with said piston.

References Cited in the file of this patent

UNITED STATES PATENTS

| | | |
|---|---|---|
| 1,392,346 | McCornack | Oct. 4, 1921 |
| 1,623,431 | McVoy | Apr. 5, 1927 |
| 1,954,930 | Greenlee | Apr. 17, 1934 |
| 2,189,224 | Roberts | Feb. 6, 1940 |
| 2,479,232 | Gunderson | Aug. 16, 1949 |
| 2,617,640 | Hieger | Nov. 11, 1952 |
| 2,702,096 | Rockwell | Feb. 15, 1955 |